June 3, 1947. W. F. ELLIOTT 2,421,489
METHOD FOR PROCESSING FIGS
Filed July 21, 1944 2 Sheets-Sheet 1
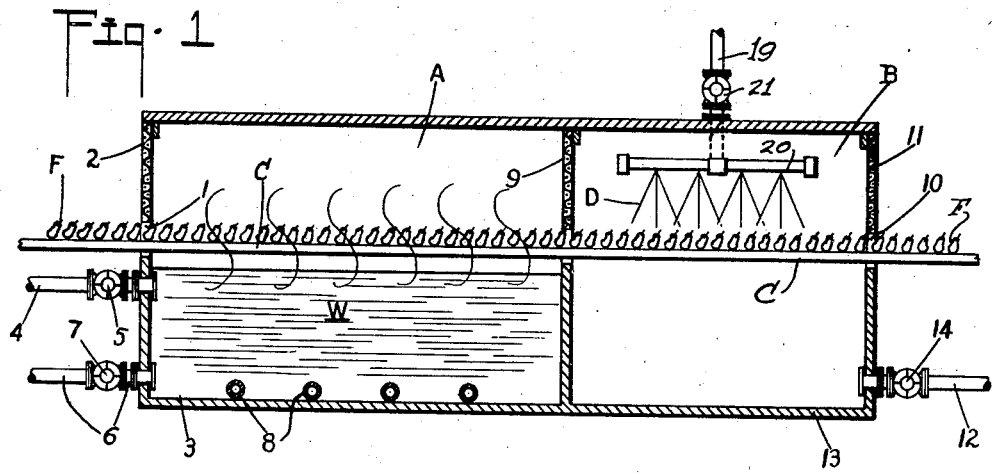
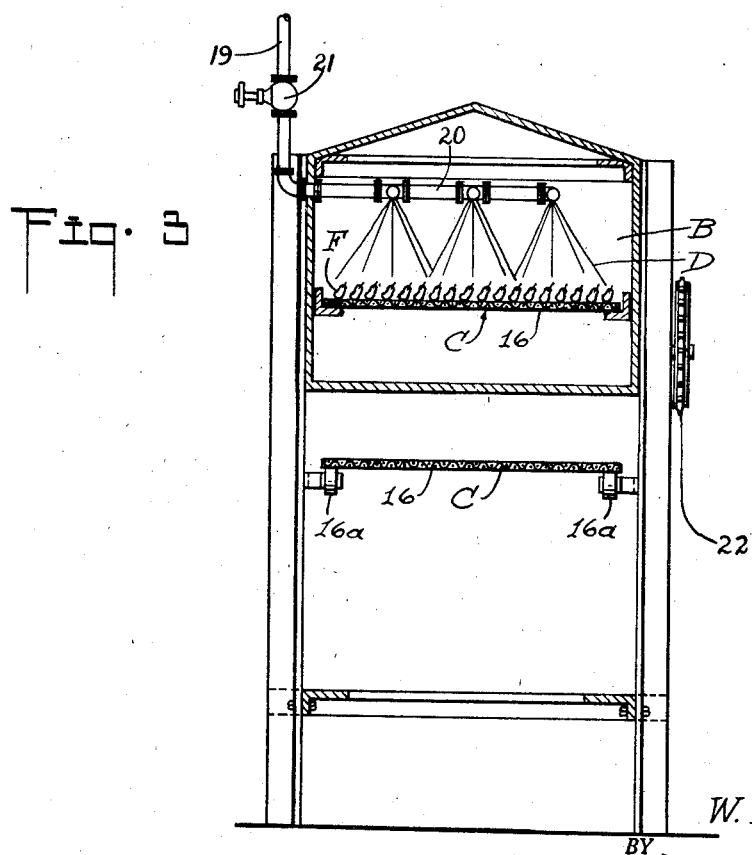
INVENTOR.
W. F. ELLIOTT
BY
ATTORNEYS

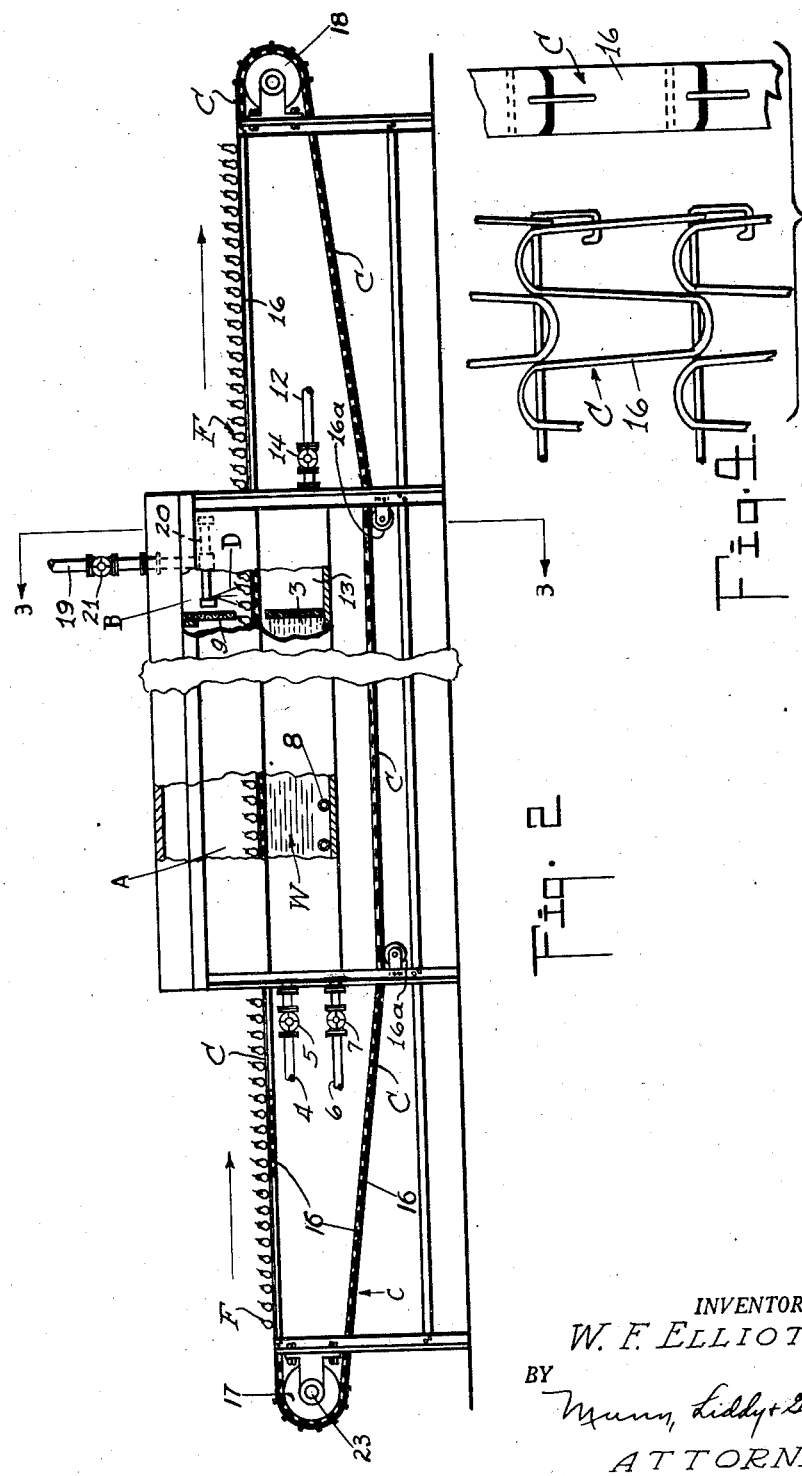

Patented June 3, 1947

2,421,489

UNITED STATES PATENT OFFICE 2,421,489

METHOD FOR PROCESSING FIGS

William F. Elliott, Merced, Calif.

Application July 21, 1944, Serial No. 546,011

2 Claims. (Cl. 99—103)

The present invention relates to improvements in a method for processing figs, and it consists of the steps of the method hereinafter described and claimed.

An object of my invention is to process figs preparatory to canning, for eliminating from the figs the sap contained in the skins or pulpy portion. The extracting and washing of the sap from the figs removes the bitter and unpleasant taste. This process is known as blanching and the figs are then ready for canning.

One of the previous methods is to apply live steam directly to the fruit. In the Beckwith et al., Patent No. 2,122,021, issued June 28, 1938, the steam is tempered by coming in contact with a spray of hot water. Another method is to immerse the fruit in water at either boiling or near boiling temperatures. The disadvantage of either of these two methods is that the fruit is collapsed to a degree sufficient to allow the fruit juices to flow out of the fruit.

The principal object of the present invention is to provide a method for processing figs wherein the fruit is not collapsed to a degree that will permit the fruit juices to escape.

Other objects and advantages will appear in the following specification, and the novel features of my method will be particularly pointed out in the appended claims.

My invention is illustrated in the accompanying drawing forming a part of this application, in which:

Figure 1 is a diagrammatic view setting forth the steps of the process;

Figure 2 is a side elevation of an apparatus for carrying out the process, portions of the apparatus being shown in section;

Figure 3 is a transverse section taken along the lines 3—3 of Figure 2; and

Figure 4 is a plan and side view of the chain used.

While I have shown only the preferred form of my invention, it should be understood that various changes or modifications may be made within the scope of the appended claims without departing from the spirit and scope of the invention.

In carrying out my invention I will first describe the steps of the process and will then set forth one apparatus for carrying it out. In Figure 1 a compartment A is shown in which the figs are subjected to water vapor at a temperature below 212° F. A second compartment B is placed alongside the compartment A and the figs pass from the compartment A into this compartment and are subjected to a cooling water spray for reducing the temperature of the figs to a point where they may be handled.

A continuous fig conveying means C carries figs F first into the compartment A and then into the compartment B. The conveying means C carries the figs through an entrance opening 1 provided in the compartment A and a curtain 2 covers the opening down to a point just above the tops of the figs. If desired the lower curtain edge may contact with the figs. A water tank 3 is disposed in the compartment A and under the fig conveying means C. The water W in the tank has its level lower than the fig conveying means C so that at no time the figs will be immersed in hot water.

The tank 3 has a water inlet pipe 4 controlled by a valve 5 and hot water may be delivered to the tank at the proper temperature. A water outlet pipe 6 communicates with the tank near the tank bottom and a valve 7 controls the flow of water out from the tank. If desired, a continuous flow of water into and out from the tank may be maintained with the water kept at a temperature below 212° F. It is possible to retain the water in the tank and keep it heated by steam pipes 8 to the desired temperature. It is obvious that other water heating means may be resorted to, such as oil or gas burners, not shown. So far as the process is concerned the temperature of the water is kept below 212° F.

The first step of my process is to pass the figs over the body of heated water so that the fruit is subjected to water vapor that is heated to a point below 212° F. There is no contact between the fruit and the hot water at any time and the water vapor has the effect of sweating the sap from the figs. The fig conveying means can be of any type desired so that the sap can pass from the figs into the water tank 3.

A curtain 9 separates the compartment A from the compartment B. The figs in passing through the compartment B are subjected to cold water sprays D. This is the second and last step in the process of blanching. The cold water sprayed onto the fruit reduces the temperature of the fruit to a point where it may be handled by the processors. In actual practice it has been found that the sap will be eliminated from the fruit before the fruit hits the cold water sprays. The fruit then emerges from compartment B by passing through the outlet opening 10 that is partially covered by a curtain 11. A water outlet pipe 12 communicates with a tank 13 that is placed under the water sprays D and the pipe conveys the water away. A valve 14 controls the flow of water through the pipe.

One apparatus for carrying out the above process is shown in Figures 2 and 3. A hercules conveyor has a flat wire conveyor belt 16 about thirty-six inches wide of the type shown in Figure 4. The belt is passed around two pairs of end sprockets 17 and 18 and extends through a housing containing the two compartments A and B. The belt comprises the fig conveying means C. The compartment A has the parts already mentioned as being used with the compartment A of Figure 1, and similar parts are given like reference numerals. In the compartment B the water forming the water sprays D enters through a pipe 19 and thence passes into a plurality of branch pipes 20, these latter pipes carrying nozzles for spraying the water on the fruit. A valve 21 controls the flow of water through pipe 19.

Conveyor C is endless and power is transmitted to the conveyor by a drive sprocket 22, see Figure 3. This sprocket is mounted on the shaft 23 that supports the sprocket 17. The conveyor slowly moves the figs through the two compartments. When the figs emerge from the compartment B they will be cool enough to permit the processors to remove them from the conveying means and place them in containers for canning.

In my process, all hot water sprays are eliminated. There is no contact between the hot water and the fruit. Only water vapor contacts with the fruit. No steam contacts the fruit. Water vapor is considerably lower in temperature than steam. The water in chamber A is heated to a temperature below 212° F. by the steam pipes running through the storage water.

It should be noted that idler wheels 16a are carried by the frame and bear against that portion of the conveyor C that moves under the compartments A and B.

I claim:

1. A method of processing figs including the steps of heating a body of water to a temperature of less than 212° Fahrenheit so as to preclude formation of live steam, confining the heated water vapors rising from the body of water in a zone above the latter, and conveying figs through the zone of the confined heated water vapors with the figs out of contact with the body of water, all in the absence of live steam in the zone.

2. A method of processing figs including the steps of heating a body of water to a temperature of less than 212° Fahrenheit so as to preclude formation of live steam, confining the heated water vapors rising from the body of water in a zone above the latter, and conveying figs through the zone of the confined heated water vapors in a path paralleling the surface of the water and in proximity therewith, with the figs out of contact with the body of water, all in the absence of live steam in the zone.

WILLIAM F. ELLIOTT.

REFERENCES CITED

The following references are of record in the file of this patent:

UNITED STATES PATENTS

| Number | Name | Date |
| --- | --- | --- |
| 2,122,021 | Beckwith et al. | June 28, 1938 |
| 2,114,409 | Tyler | Apr. 19, 1938 |
| 1,782,522 | Tyler et al. | Nov. 25, 1930 |